(12) United States Patent
Barrou et al.

(10) Patent No.: US 10,871,589 B2
(45) Date of Patent: Dec. 22, 2020

(54) SYSTEM AND METHODS FOR REMOVING NOISE FROM ACOUSTIC IMPEDANCE LOGS

(71) Applicant: SCHLUMBERGER TECHNOLOGY CORPORATION, Sugar Land, TX (US)

(72) Inventors: Thomas Barrou, Cachan (FR); Gaelle Jannin, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 376 days.

(21) Appl. No.: 14/972,961

(22) Filed: Dec. 17, 2015

(65) Prior Publication Data
US 2016/0178779 A1     Jun. 23, 2016

(30) Foreign Application Priority Data

Dec. 17, 2014   (EP) ..................................... 14290389

(51) Int. Cl.
*G01V 1/46*     (2006.01)
*G01V 1/48*     (2006.01)
*E21B 47/12*    (2012.01)

(52) U.S. Cl.
CPC ................ *G01V 1/46* (2013.01); *E21B 47/12* (2013.01); *G01V 1/48* (2013.01)

(58) Field of Classification Search
CPC ............. G01V 1/48; G01V 1/46; E21B 47/12
(Continued)

(56) References Cited

U.S. PATENT DOCUMENTS 3,275,095 A * 9/1966 Blizard ..................... G01V 1/50
367/27
4,566,084 A * 1/1986 Laine ....................... G01H 5/00
367/49
(Continued)

FOREIGN PATENT DOCUMENTS

| WO | 8501586 A1 | 4/1985 |
| WO | 2014137844 A1 | 9/2014 |
| WO | WO 2014/137844 | * 9/2014 |

OTHER PUBLICATIONS

Extended European Search Report issued in European Application No. 14290389.7 dated Jun. 19, 2015 (6 pages).

*Primary Examiner* — Hovhannes Baghdasaryan
*Assistant Examiner* — Amie M Ndure (57) ABSTRACT

Embodiments of the disclosure can include systems and methods for removing in-situ noise from well logging data. In one embodiment, a method can include acquiring noise-calibration data for a logging tool, (the noise-calibration data including data obtained by the logging tool operating under one or more calibration conditions), generating a noise-signature waveform for the logging tool based at least in part on the noise-calibration data, acquiring logging data from the logging tool (the logging data including data obtained by the logging tool operating in a wellbore under one or more operating conditions), generating, based at least in part on the logging data, an uncorrected logging waveform for the logging tool operating in the wellbore under the one or more operating conditions, and modifying the uncorrected logging waveform based at least in part on the noise-signature waveform to generate a corrected logging waveform for the wellbore.

19 Claims, 6 Drawing Sheets

(58) Field of Classification Search
USPC .......................................................... 367/13
See application file for complete search history.

(56) References Cited

U.S. PATENT DOCUMENTS

| | | | | |
|---|---|---|---|---|
| 4,642,800 | A | | 2/1987 | Umeda |
| 4,796,237 | A | * | 1/1989 | Hutchens ................ G01S 7/527 |
| | | | | 181/105 |
| 5,144,126 | A | * | 9/1992 | Perry .................... E21B 47/011 |
| | | | | 250/254 |
| 5,469,736 | A | * | 11/1995 | Moake .................. E21B 47/082 |
| | | | | 166/254.2 |
| 5,999,489 | A | * | 12/1999 | Lazaratos ................ G01V 1/42 |
| | | | | 367/50 |
| 8,117,907 | B2 | * | 2/2012 | Han ...................... E21B 47/082 |
| | | | | 73/152.58 |
| 2010/0265796 | A1 | * | 10/2010 | Steinsiek .............. B06B 1/0622 |
| | | | | 367/35 |
| 2013/0192356 | A1 | * | 8/2013 | De Graff .................. F41H 1/04 |
| | | | | 73/152.01 |
| 2013/0342077 | A1 | * | 12/2013 | Lautzenhiser .......... H01L 41/04 |
| | | | | 310/327 |
| 2014/0204700 | A1 | * | 7/2014 | Valero .................... G01S 15/006 |
| | | | | 367/7 |
| 2015/0241596 | A1 | * | 8/2015 | Donderici ................ G01V 3/28 |
| | | | | 324/338 |

* cited by examiner

SYSTEM AND METHODS FOR REMOVING NOISE FROM ACOUSTIC IMPEDANCE LOGS

FIELD OF THE DISCLOSURE

This disclosure relates to well logging, and, more particularly to systems and methods for removing in-situ noise from well logging data.

BACKGROUND

Wells are often drilled in to the ground to facilitate the extraction of a natural resource from a subsurface reservoir, to facilitate the injection of a fluid into surface to a subsurface reservoir, or to facilitate the evaluation and monitoring of subsurface formations. The drilling process is sometimes referred to as borehole drilling, and the resulting borehole is often referred to as a "wellbore". Wells can be used to extract (produce) hydrocarbons, such as oil, natural gas, water, or the like.

When a well is drilled into a geological formation, logging tools are often used to determine a variety of characteristics of the well. Some logging tools may be used, for example, to acquire data (also referred to as "logging data" or "log data") that is used to determine characteristics the formation (e.g., the rock) surrounding the well, to assess the structural integrity of casing, to determine when cement has been properly installed in the well to achieve zonal isolation, or the like. Log data acquired from an Ultra-Sonic Imager (USI) logging tool, for example, can be used to generate a well log that shows casing thickness, the acoustic impedance of material behind the casing, and the like.

As drilling processes have evolved, it has become increasingly desirable to extend the operating envelope of logging tools into thicker, larger casings and heavier muds. In some instances, operating frequencies of the logging tools are decreased and gain is increased to facilitate operation in these conditions. Unfortunately, logging data acquisition and processing can be highly sensitive to noise in these types of conditions (e.g., operating conditions including relatively low-frequency and relatively high gains), and this sensitivity can make it difficult to interpret the resulting logging data.

SUMMARY

Embodiments of the disclosure can include methods and systems for removing in-situ noise from well logging data. In one embodiment, a method is provided. The method can include acquiring noise-calibration data for a logging tool (the noise-calibration data including data obtained by the logging tool operating under calibration conditions), generating a noise-signature waveform for the logging tool based at least in part on the noise-calibration data, acquiring logging data from the logging tool (the logging data including data obtained by the logging tool operating in a wellbore under operating conditions), generating, based at least in part on the logging data, an uncorrected logging waveform for the logging tool operating in the wellbore under the operating conditions, and modifying the uncorrected logging waveform based at least in part on the noise-signature waveform to generate a corrected logging waveform for the wellbore.

In another embodiment, a non-transitory computer-readable storage medium having computer-executable instructions is provided. The instructions are executable by processors to cause the processors to acquire noise-calibration data for a logging tool (the noise-calibration data including data obtained by the logging tool operating under calibration conditions), generate a noise-signature waveform for the logging tool based at least in part on the noise-calibration data, acquire logging data from the logging tool (the logging data including data obtained by the logging tool operating in a wellbore under operating conditions), generate, based at least in part on the logging data, an uncorrected logging waveform for the logging tool operating in the wellbore under the operating conditions, and modify the uncorrected logging waveform based at least in part on the noise-signature waveform to generate a corrected logging waveform for the wellbore.

In yet another embodiment, a system is provided. The system can include a logging tool for obtaining logging data and a logging processor including processors and memory storing computer-executable instructions that are executable by the processors to cause the processors to acquire noise-calibration data for a logging tool (the noise-calibration data including data obtained by the logging tool operating under calibration conditions), generate a noise-signature waveform for the logging tool based at least in part on the noise-calibration data, acquire logging data from the logging tool (the logging data including data obtained by the logging tool operating in a wellbore under operating conditions), generate, based at least in part on the logging data, an uncorrected logging waveform for the logging tool operating in the wellbore under the operating conditions, and modify the uncorrected logging waveform based at least in part on the noise-signature waveform to generate a corrected logging waveform for the wellbore.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

While the disclosure is susceptible to various modifications and alternative forms, specific embodiments thereof are shown by way of example in the drawings and will herein be described in detail. The drawings may not be to scale. It should be understood, however, that the drawings and detailed description thereto are not intended to limit the disclosure to the particular form disclosed, but to the contrary, the intention is to cover all modifications, equivalents, and alternatives falling within the spirit and scope of the present disclosure as defined by the appended claims.

DETAILED DESCRIPTION

As discussed in more detail below, certain embodiments are systems and methods for removing in-situ noise from well logging data. For example, in one embodiment, a method can include recording and identifying in-situ noise for a logging tool, and removing the noise from log data acquired using the logging tool.

In some embodiments, logging operations can be performed to determine characteristics of a well. For example, logging operations can be performed to determine parameters of a geological formation surrounding the well, the shape and texture of the wellbore of the well, or the quality of cement installation behind a casing in the well, and so forth. Logging operations may include moving a logging tool through the well to obtain physical measurements of various sections of the well. In some embodiments, a measurement is acquired by activating (also referred to as "triggering" or "firing") a transducer of the logging tool to generate/emit pulses of acoustic energy into the surrounding environment and measure the acoustic waveforms that are returned. Because the returning waveforms vary depending on the characteristics of the medium into which they are emitted, the measured waveforms can be used to determine characteristics of the medium. For example, if a pulse is emitted into a casing and the material behind the casing, the measured waveforms can be used to determine whether the material on the other side of the casing is a solid, a liquid, or gas. In some embodiments, these determinations can be extended to determine various characteristics of the well. For example, it may be determined that the well is cemented properly if the measurements indicate that the cement behind the casing is primarily solids, or it may be determined that the well is not cemented properly if the measurements indicate that the cement behind the casing has a relatively high concentration of liquids.

In some embodiments, a logging operation can include rotating the logging tool and acquiring measurements as the logging tool rotates. This can enable the tool to provide logging data about the mediums in some or all of the environment surrounding the logging tool. In some embodiments, a logging tool can acquire about thirty-six to seventy-two measurements per revolution (e.g., a measurement is taken about every 10° (degrees) to 5° of rotation). A measurement rate can be selected to meet the requirements of the particular logging operation. The angle of the logging tool may be referred to its azimuth. In some instances, the azimuth can be measured relative to a given angle/direction, such as true north. During each measurement, a transducer of the logging tool can be triggered while being directed to the azimuth for the measurement to generate an acoustic pulse that is directed into the well at the given azimuth. The acoustic signals reflected from the well can be measured (e.g., sensed by a sensing element of the transducer), thereby generating a measurement (e.g., a logging waveform) for the given angle (or azimuth) and depth of the logging tool at the time of the measurement. In some instances, the logging tool can be moved through the wellbore (e.g., raised or lowered in the wellbore) as it is rotated, resulting in measurement being taken in a spiral pattern. In some embodiments, the logging tool may generate log data that corresponds to one or more of these types of logging measurements. The log data may be stored in the logging tool for later use and/or it may be transmitted to a data processing system for use in generating a log for the well and/or determining characteristics of the well.

As mentioned above, recent developments in well drilling, such as the use of heavier drilling fluids and lighter cement, may reduce the ability of logging tools to acquire data that accurately reflects characteristics of the well. To account for these developments, the operating frequency may be reduced and gain may be increased, but doing so may introduce additional noise. It is believed that the electronic circuitry of these tools produce noise that is detected in the measured return signals. For example, the electronic circuitry used to generate the acoustic pules and/or detect the return signals may introduce noise into the electrical representation of the return signal. Moreover, it is believed that noise may be introduced due to the physical movement and interaction of components within the logging tool. For example, a motor used to rotate the logging tool during a logging process may introduce acoustic noise into the electrical representation of the return signal. This noise may be coherent—that is, the noise may consistently tend to occur at the same points in time in relation to some starting point. For example, for a given orientation of the tool (e.g., a given azimuth) the noise may occur at or near the same time relative to generation/emission of the corresponding acoustic pulse.

In some embodiments, a logging operation can include performing a calibration operation to generate a noise signature for a logging tool, and performing a logging operation using the logging tool, including acquiring log data using the logging tool and correcting the log data based at least in part on the calibration operation. In some embodiments, the calibration operation can include operating the logging tool in accordance with a set of calibration conditions (e.g., that are the same or similar to a set of operating conditions in which the logging tool is expected to be used), acquiring log data from the logging tool operating under the set of calibration conditions ("noise calibration data"), and generating, based at least in part on the noise calibration data, a noise signature (e.g., a noise-signature waveform) for the logging tool under the calibration conditions. In some embodiments, the logging operation can include operating the logging tool under the set of operating conditions to obtain log data, generating uncorrected logging waveforms using the log data, modifying the uncorrected logging waveforms based at least in part on the noise signature for the logging tool (e.g., subtracting the noise-signature waveforms from the corresponding uncorrected logging waveforms) to generate corrected logging waveforms (e.g., logging waveforms from which in situ-noise identified in the calibration process has been removed), using the corrected logging waveforms to generate corrected log data (e.g., including a well log based at least in part on the corrected logging waveforms), and determining/presenting characteristics of the well (e.g., a quality of cementing) based at least in part on the corrected log data.

Although certain embodiments are described herein with regard to acoustic logging tools for the purpose of illustration, the techniques described herein may be extended to other types of logging tools and related logging operations. For example, similar techniques may be used with logging tools that employ electromagnetic signals and/or radiation.

Figure 1:
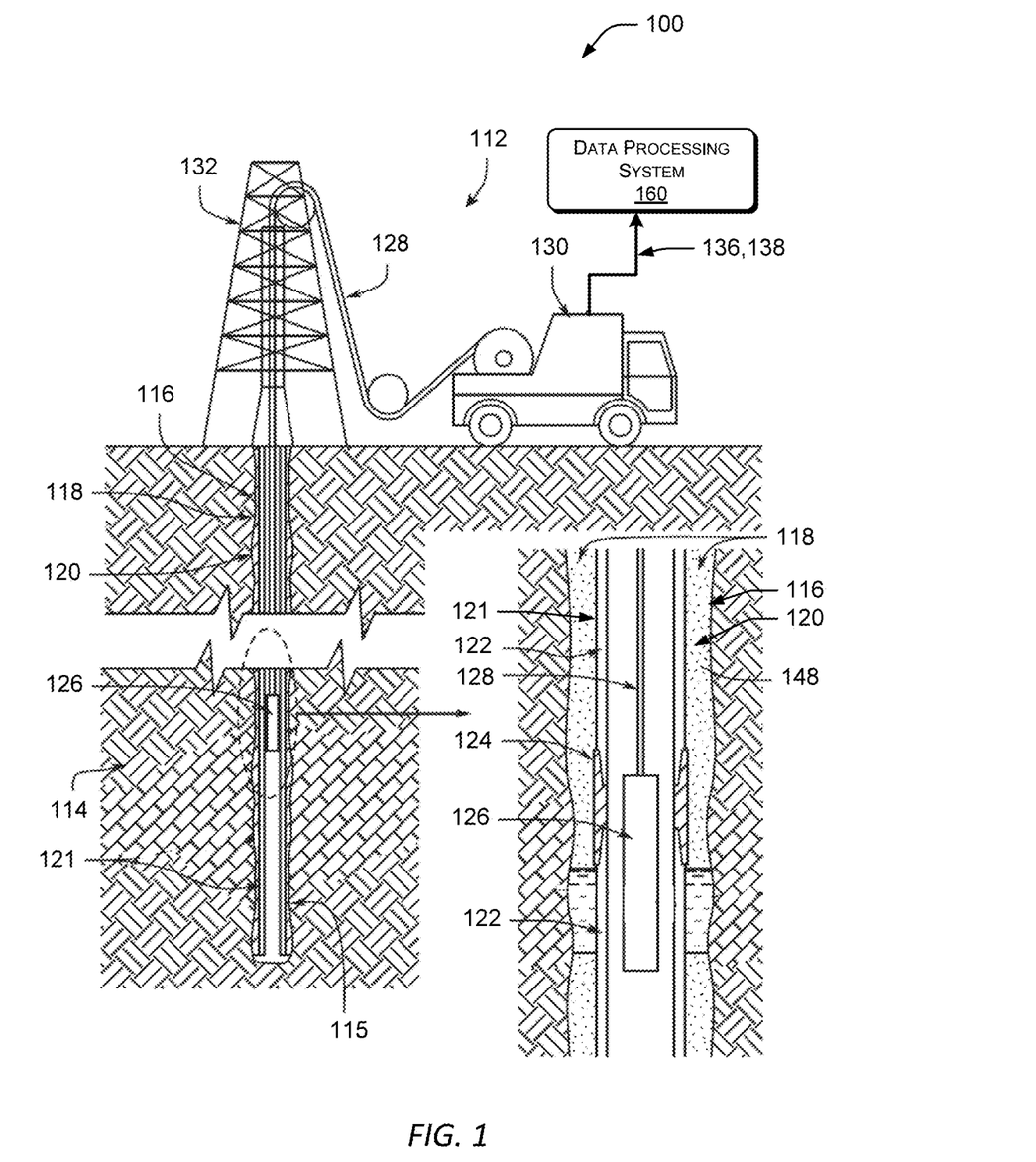
FIG. 1 is a diagram that illustrates a well logging system in accordance with one or more embodiments.

FIG. 1 is a diagram that illustrates a well logging system ("system") 100 in accordance with one or more embodiments. The system 100 may be employed for removing in-situ noise from logging data obtained by a downhole well logging tool (e.g., an acoustic logging tool). In the illustrated embodiment, system 100 can include surface equipment 112 disposed above a geological formation 114. In the illustrated embodiment, a drilling operation has been carried out to drill a well 115, having wellbore 116. Annular fill 118 (e.g., cement) has been used to seal an annulus 120—the space between the wellbore 116 and a casing string 121, including casing joints 122 and casing collars 124.

In the illustrated embodiment, casing joints 122 are coupled together by the casing collars 124 to stabilize the wellbore 116. The casing joints 122 include lengths of pipe approximately 13 meters (m) or 40 feet (ft) in length, and may include an externally threaded (male thread form) connection at each end. A casing collars 124 having a corresponding internally threaded (female thread form) connection may connect two nearby casing joints 122. Coupled in this way, the casing joints 122 may be assembled to form the casing string 121 having a suitable length and specification for the wellbore 116. The casing 121, including the casing joints 122 and/or collars 124, may be made of carbon steel, stainless steel, or other suitable materials to withstand a variety of forces, such as collapse, burst, and tensile failure, as well as chemically aggressive fluid.

The surface equipment 112 may carry out various well logging operations to measure and determine conditions/characteristics of the well 115. The well logging operations may measure parameters of the geological formation 114 (e.g., resistivity or porosity) and/or the wellbore 116 (e.g., temperature, pressure, fluid type, or fluid flowrate). Other measurements may provide acoustic evaluation data, such as cement evaluation data (e.g., flexural attenuation and/or acoustic impedance data) that can be used to verify the cement installation, including the resulting zonal isolation of the wellbore 116. Although certain embodiments are described in the context of a single logging tool for the purpose of illustration, one or more acoustic logging tools may be employed to obtain some or all of these measurements.

In the illustrated embodiment, an acoustic logging tool ("logging tool") 126 is conveyed through the wellbore 116 by a cable 128. The cable 128 may include a mechanical cable, an electrical cable, and/or an electro-optical cable that includes, for example, a fiber line protected against the harsh environment of the wellbore 116. The logging tool 126 may be conveyed using any suitable form of conveyance, such as coiled tubing conveyance.

The logging tool 126 may be, for example, an UltraSonic Imager (USI) tool and/or an Isolation Scanner (IS) tool provided by Schlumberger Technology Corporation, having offices in Sugarland, Tex., U.S.A. In some embodiments, the logging tool 126 is employed to obtain measurements of acoustic impedance from ultrasonic waves and/or flexural attenuation. For example, the acoustic logging tool 126 may obtain a pulse echo measurement that exploits the thickness mode (e.g., in the manner of an ultrasonic imaging tool) or may perform a pitch-catch measurement that exploits the flexural mode (e.g., in the manner of an imaging-behind-casing (IBC) tool). These measurements may be used as evaluation data to determine characteristics of the well 115, such as acoustic cement evaluation data to identify likely locations where solid, liquid, or gas is located in the annular fill 118 behind the casing 121.

The logging tool 126 may be deployed inside the wellbore 116 by the surface equipment 112. The surface equipment may include a vehicle 130 and/or a deploying system such as a drilling rig 132. Log data 136 related to the geological formation 114 or the wellbore 116 gathered by the acoustic logging tool 126 may be transmitted to the surface (e.g., from logging tool 126 to the data processing system 160 described below) for processing and analysis, and/or stored in a memory of the logging tool 126 for later processing and analysis. Noise calibration data 138 related to the geological formation 114 or the wellbore 116 gathered by the logging tool 126 may be transmitted to the surface for processing and analysis, and/or stored in the a memory of the logging tool 126 for later processing and analysis. As will be discussed further below, the vehicle 130 may be fitted with or may communicate with a computer and software (e.g., the data processing system 160 described below) to perform data collection and analysis.

As mentioned above, the logging tool 126 may be employed to obtain log data 136 (e.g., acoustic cement evaluation data) relating to the presence of solids, liquids, or gases behind the casing 122. For instance, the logging tool 126 may obtain measures of acoustic impedance and/or flexural attenuation, which may be used to determine whether the material behind the casing 122 is a solid (e.g., is properly set cement) or includes liquids or gas (e.g., is not properly set cement). When the acoustic logging tool 126 provides such measurements to the surface equipment 112 (e.g., through the cable 128), the surface equipment 112 may pass the measurements as log data 136 (e.g., acoustic cement evaluation data) to a data processing system 160. Data processing system 160 may process the log data 136 to determine one or more characteristics of the well 115. Data processing system 160 may process the noise calibration data 136 to determine one or more characteristics of the logging tool 126.

Figure 2:
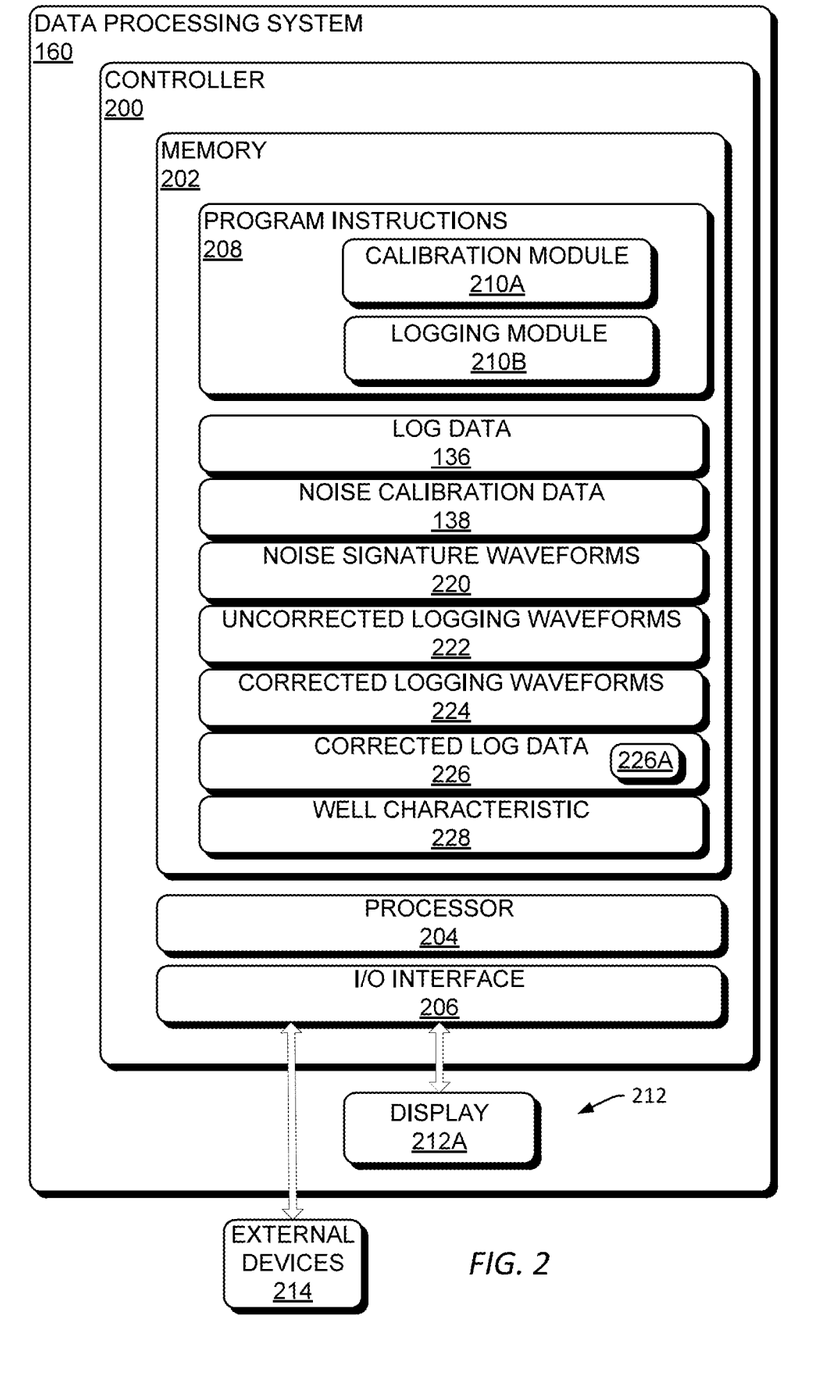
FIG. 2 is a diagram that illustrates a data processing system in accordance with one or more embodiments.

FIG. 2 is a diagram that illustrates a data processing system 160 in accordance with one or more embodiments. In some embodiments, data processing system 160 can include a controller 200 for controlling the operational aspects of data processing system 160. In some embodiments, controller 200 can include a memory 202, a processor 204 and an input/output (I/O) interface 206. Memory 202 may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), and/or the like. Memory 202 may include a non-transitory computer readable storage medium having program instructions 208 stored thereon that are executable by a computer processor (e.g., processor 204) to cause the functional operations (e.g., methods/routines/processes) described herein, including those described with regard to data processing system 160. Program instructions 208 may include program modules (e.g., including program instructions) that are executable by processor 204 to provide some or all of the functionality described herein, including that described with regard to data processing system 160. Program instructions 208 may include, for example, a calibration module 210A (e.g., for performing some or all of the operational aspects of the method 300A described herein with regard to at least FIG. 3A), and a logging module 210B (e.g., for performing some or all of the operational aspects of the method 300B described herein with regard to at least FIG. 3B).

Processor 204 may be any suitable processor capable of executing/performing program instructions. Processor 204 may include a central processing unit (CPU) that carries out program instructions (e.g., program instructions of modules 210A and/or 210B) to perform arithmetical, logical, and input/output operations described herein, including those described with regard to data processing system 160. In some embodiments, processor 204 includes any suitable circuitry that is capable of performing the processing task described herein. For example, a processor 204 may include analog parts and signal paths, an analog/digital converter (ADC), field-programmable gate array (FPGA) (e.g., driving an ADC), a digital signal processor (DSP) (e.g., communicating with FPGA), and/or other micro controller units.

I/O interface 206 may provide an interface for communication with one or more I/O devices 212, such as I/O a mouse/keyboard/touchscreen, a graphical user interface (GUI) (e.g., a display 212A), and/or the like. Display 212A may include a suitable electronic display that can display well logs and/or other information relating to well 115. Devices may be connected to I/O interface 206 via a wired or wireless connection.

I/O interface 206 may provide an interface for communication with one or more external devices 214, such as various components of system 100 (e.g., vehicle 130, logging tool 126, and/or the like). A network may facilitate communication with other entities coupled to the network, such as servers, client devices, networked databases (e.g., for storing the data described herein and/or providing access thereto), and/or the like. A network may include an electronic communications network, such as the Internet, a local area network ("LAN"), a wide area ("WAN"), a wireless local area network ("WLAN"), a cellular communications network, and/or the like. In some embodiments, a network includes a single network or combination of networks.

The data processing system 160 may process noise calibration data 138 and/or log data 136 (e.g., using techniques in accordance with the embodiments described herein) to generate corrected log data (e.g., corrected log waveforms and well logs) and/or determine one or more characteristics of the well 115 (e.g., characteristics of the formation, cement quality and the like). For example, data processing system 160 may acquire noise calibration data 138 (e.g., including measurements/log data obtained by the logging tool 126 operating in the wellbore 116 under a set of calibration conditions), generate a noise signature (e.g., one or more noise-signature waveforms 220) for the logging tool 126 based at least in part on the noise calibration data 138, acquire log data 136 (e.g., including measurements/log data acquired by the logging tool 126 operating in the wellbore 116 under a set of operating conditions), generate uncorrected log data (e.g., one or more raw/uncorrected logging waveforms 222) based at least in part on the log data 136), modify the uncorrected logging data based at least in part on the noise signature for the logging tool 126 to generate corrected log data (e.g., subtract noise-signature waveforms 220 from the corresponding uncorrected logging waveforms 222 to generate, for example, corrected logging waveforms 224 and/or corrected log data 226, including one or more corrected well logs 226A for the well 115 generated using the corrected logging waveforms 224), and use the corrected log data 226 (e.g., corrected well log 226A) to determine one or more characteristics 228 of the well 115. The various data (e.g., the log data 136, the noise calibration data 138, the noise-signature waveforms 220, the logging waveforms 222, the corrected logging waveforms 224 and/or the corrected log data 226, including the corrected well log 226A) may be stored in memory (e.g., the memory 202 and/or an external device 212, such as an external database) and/or presented to a user via an I/O device 212 (e.g., be displayed via display 212A).

Figure 3A:
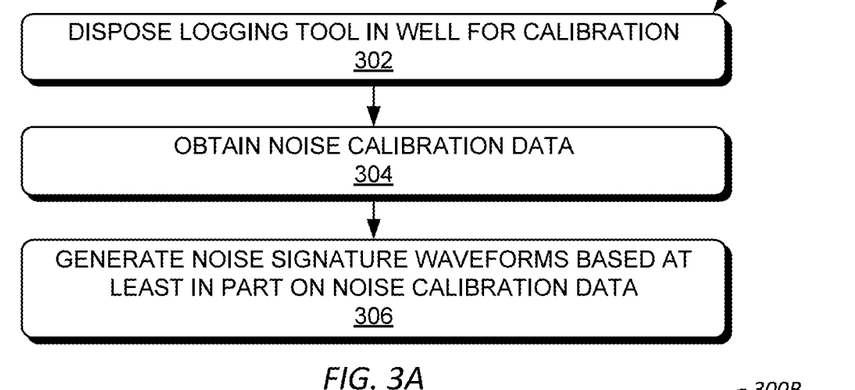
FIG. 3A is a flowchart that illustrates a method for calibrating a logging tool in accordance with one or more embodiments.
Figure 3B:
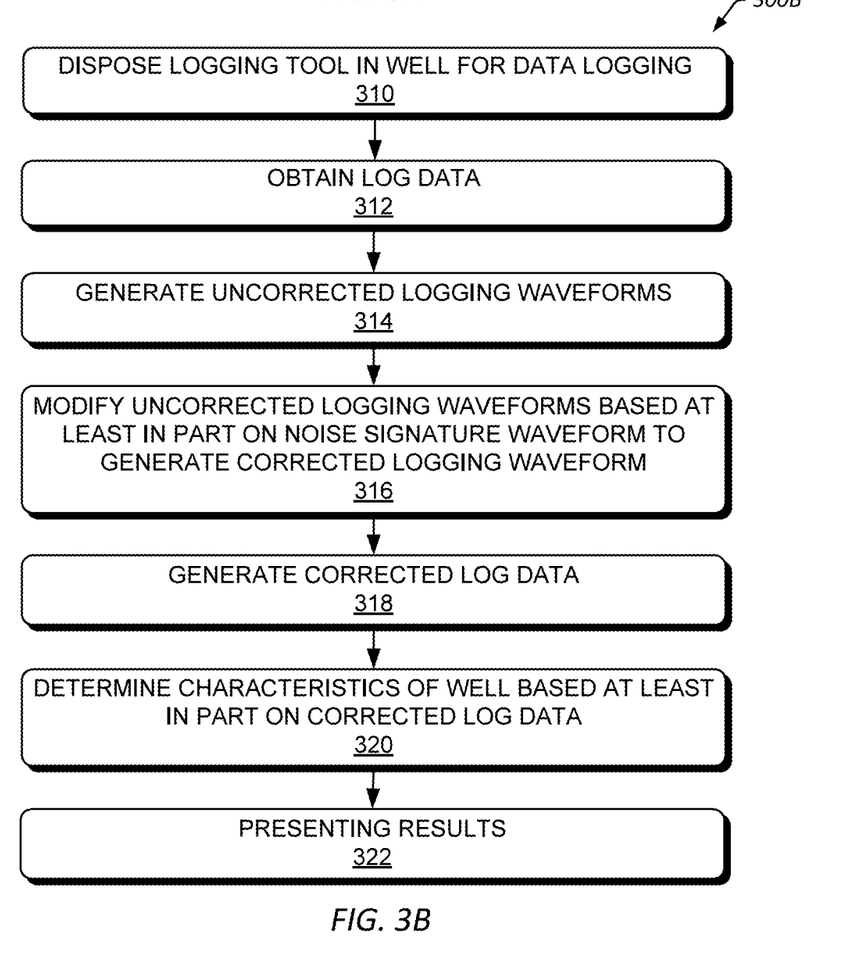
FIG. 3B is a flowchart that illustrates a method for determining characteristics of a well based at least in part on calibration of the logging tool in accordance with one or more embodiments.

FIG. 3A is a flowchart that illustrates a method 300A for calibrating a logging tool in accordance with one or more embodiments. Method 300A can generally include disposing a logging tool in a well for tool calibration (block 302), obtaining noise calibration data (block 304), and generating noise-signature waveforms based at least in part on the noise calibration data (block 306). FIG. 3B is a flowchart that illustrates a method 300B for determining characteristics of a well based at least in part on the calibration of the logging tool in accordance with one or more embodiments. Method 300B can generally include disposing a logging tool in the well for data logging (block 310), obtaining log data for the well (block 312), generating uncorrected logging waveforms (block 314), modifying the uncorrected logging waveforms based at least in part on the noise-signature waveforms to generate corrected logging waveforms (block 316), generating corrected log data (block 318), determining characteristic(s) of the well based at least in part on the corrected log data (block 320), and presenting the results (block 322).

Referring to method 300A of FIG. 3A, in some embodiments, disposing a logging tool in a well for tool calibration (block 302) can include positioning the logging tool 126 at calibration location, including, for example, a given depth and/or azimuth in wellbore 116. The calibration location may be the same or similar to a corresponding logging location. For example, if logging tool 126 is to be used to log a first logging location including a 100 foot (about 30.5 meters) segment of the wellbore 116 extending from a depth of about 15,000 feet (4572 meters) to a depth of about 15,100 feet (4603 meters) and the logging tool 126 is to be calibrated at or near the start of the logging location, disposing the logging tool 126 in the well 115 for tool calibration may include disposing the logging tool 126 in wellbore 116 at a depth of about 15,000 feet (4603 meters) and a azimuth of 0° (degrees). In some embodiments, data processing system 160 controls disposing the logging tool 126 in the well 115 for data logging.

In some embodiments, obtaining noise calibration data (block 304) can include obtaining noise calibration data 138 acquired by the logging tool 126 under a set of calibration conditions. In some embodiments, a set of calibration conditions can include one or more conditions that are the same or similar to the operating conditions for obtaining log data 136 (e.g., the condition under which log data 136 is to be obtained by the logging tool 126 during a corresponding logging operation). For example, calibration conditions may include a calibration location (e.g., a depth and/or azimuth) that is the same or similar to the logging location, a gain that is greater than an operating gain for the logging tool, an emission voltage that is less than an operating emission voltage for the logging tool, a tool-rotation rate that is the same or similar to an operating tool-rotation rate for the logging tool, a measurement rate that is the same or similar to an operating measurement rate for the logging tool, an acquisition window that is the same or similar to an operating acquisition window for the logging tool, a pressure that is the same or similar to an operating pressure for the logging tool, and/or a temperature that is the same or similar to an operating temperature for the logging tool. When the logging tool 126 is operating under the calibration conditions, e.g., during a calibration operation, the corresponding noise calibration data 138 may include noise contributions, but may not include ultrasonic contributions. Thus, the noise calibration data 138 may be used to readily identify noise contributions as described herein.

In some embodiments, calibration conditions can include a relatively low emission voltage (e.g., an emission voltage less than about 5 volts (V)). Such a relatively low emission voltage may avoid the emission of ultrasonic power while using internal driving signals, helping to ensure that noise is being generated/sensed/measured and not an echo signal that would otherwise be generated if a high emission voltage is used. In some embodiments, calibration conditions include a relatively large gain (e.g., about 42 dB) that is larger than the gain used during logging operations. Such a relatively large gain may help to increase the noise signals in the noise calibration data generated during the calibration process. In some embodiments, an operating rotation rate is about three to eight revolutions per second (rev/sec). In some embodiments, an operating measurement rate is about thirty-six to seventy-two measurements per revolution (meas/rev) (e.g., a measurement is taken about every 10° to 5° of rotation of the logging tool 126). In some embodiments, an operating acquisition window has a time delay between about 30 μs and 160 μs, and a duration of about 70 μs (e.g., at a delay of 30 μs measurement data may be acquired in an acquisition window from about 30 μs to about 100 μs after triggering of the logging tool transducer for the measurement). In some embodiments, an operating pressure is about 10,000-30,000 pounds-per-square-inch (psi)). In some embodiments, an operating temperature is about 200° C. (degrees Celsius).

Accordingly, if logging tool 126 is to be used to log the first logging location (e.g., the logging location including a 100 foot segment of the wellbore 116 from about 15,000-15,100 feet (having a pressure of 20,000 psi and a temperature of 200° C.)) under a set of operating conditions that include an emission voltage of about 10V, a gain of about 20 dB, a rotation rate of about five rev/sec, a measurement rate of about seventy-two meas/rev and/or an acquisition window of about 30 μs to about 100 μs, the calibration conditions may include a depth of about 15,000 feet in wellbore 116 (e.g., having a pressure of about 20,000 psi and a temperature of about 200° C.), a gain of about 42 dB, an emission voltage of about 2V, a tool-rotation rate of about five rev/sec, a measurement rate of about seventy-two meas/rev, and/or an acquisition window of about 30 μs to about 100 μs, and the calibration operation may include operating the logging tool 126 at the depth of about 15,000 feet in the wellbore 116 under the above listed set of calibration conditions and acquiring corresponding measurements therefrom.

In some embodiments, obtaining noise calibration data can include operating the tool to take a sufficient number of measurements. For example, if the calibration conditions include a measurement rate of seventy-two measurements per revolution (e.g., a measurements is to be acquired about every 5° of rotation, such as at an azimuth of 0°, 5°, 10° and so forth) and one-hundred measurements are to be taken (e.g., one-hundred waveforms are to be recorded) for each of the azimuths, obtaining noise calibration data 138 may include rotating the logging tool 126 one-hundred times under the calibration conditions to generate approximately 7,200 measurements (e.g., one-hundred waveforms for each of the seventy-two azimuths at which data is to be recorded). Each of the resulting measurements may be associated with the corresponding set of calibration conditions, including for example, the given depth and azimuth of the measurement.

In some embodiments, obtaining noise calibration data can include obtaining measurements for one or more acquisition windows. An acquisition window may include a duration of time that occurs after trigger of a transducer, and during which measurements corresponding to the trigger of the transducer are to be acquired. The timing (e.g., the beginning and end of the acquisition window) may be set relative to the time at which the transducer is triggered ("the trigger point" for the transducer). For example, an acquisition window having a time delay of about 30 μs and a duration or about 70 μs (e.g., a start time of 30 μs and an end time of 100 μs) may specify that measurements are to be taken in the 70 μs time span that occurs 30-100 μs after triggering of the transducer.

In some embodiments, if a single acquisition window is to be used for calibration, obtaining noise calibration data may include taking a measurement during this acquisition window. In the instance in which 7,200 measurements are to be acquired, if the calibration window has a time delay of about 30 μs and a duration about 70 μs, obtaining noise calibration data may include, for each of the 7,200 measurements, recording the waveform sensed from about 30 μs to about 100 μs after the transducer triggers for the measurement. In some embodiments, if multiple acquisition windows are to be used for calibration, obtaining noise calibration data may include taking measurements during each of the acquisition windows. For example, if the logging tool 126 can be configured to acquire measurements across fourteen different acquisition windows, obtaining noise calibration data may include taking a measurement during each of the fourteen acquisition windows. That is, for example, if the calibration conditions include a measurement rate of about seventy-two measurements per revolution and one-hundred measurements are to be taken for each of the azimuths, obtaining noise calibration data 138 may include, rotating the logging tool 126 one-hundred times to acquire the one-hundred waveforms for the first acquisition window (e.g., having a time delay of about 30 μs and a duration of about 70 μs) for each of the azimuths, rotating the logging tool 126 an additional one-hundred times to acquire the one-hundred waveforms for the second acquisition window (e.g., having a time delay of about 40 μs and a duration of about 70 μs) for each of the azimuths, and so forth for each of the acquisition windows.

In some embodiments, the noise calibration data 138 is time referenced to a corresponding event, such as an event of a logging tool operation. For example, a measurement may be time-referenced relative to an emission event, including the time at which the transducer of the logging tool is triggered to generate the measurement (e.g., a "trigger point"). If for example, a subset of calibration data 138 includes a waveform that is acquired over a window that occurs between about 30 μs and about 100 μs after the triggering of the transducer, the first data point of the measurement may include a time stamp of about 30 μs and the last data point of the waveform may include a timestamp of about 100 μs.

Figure 4:
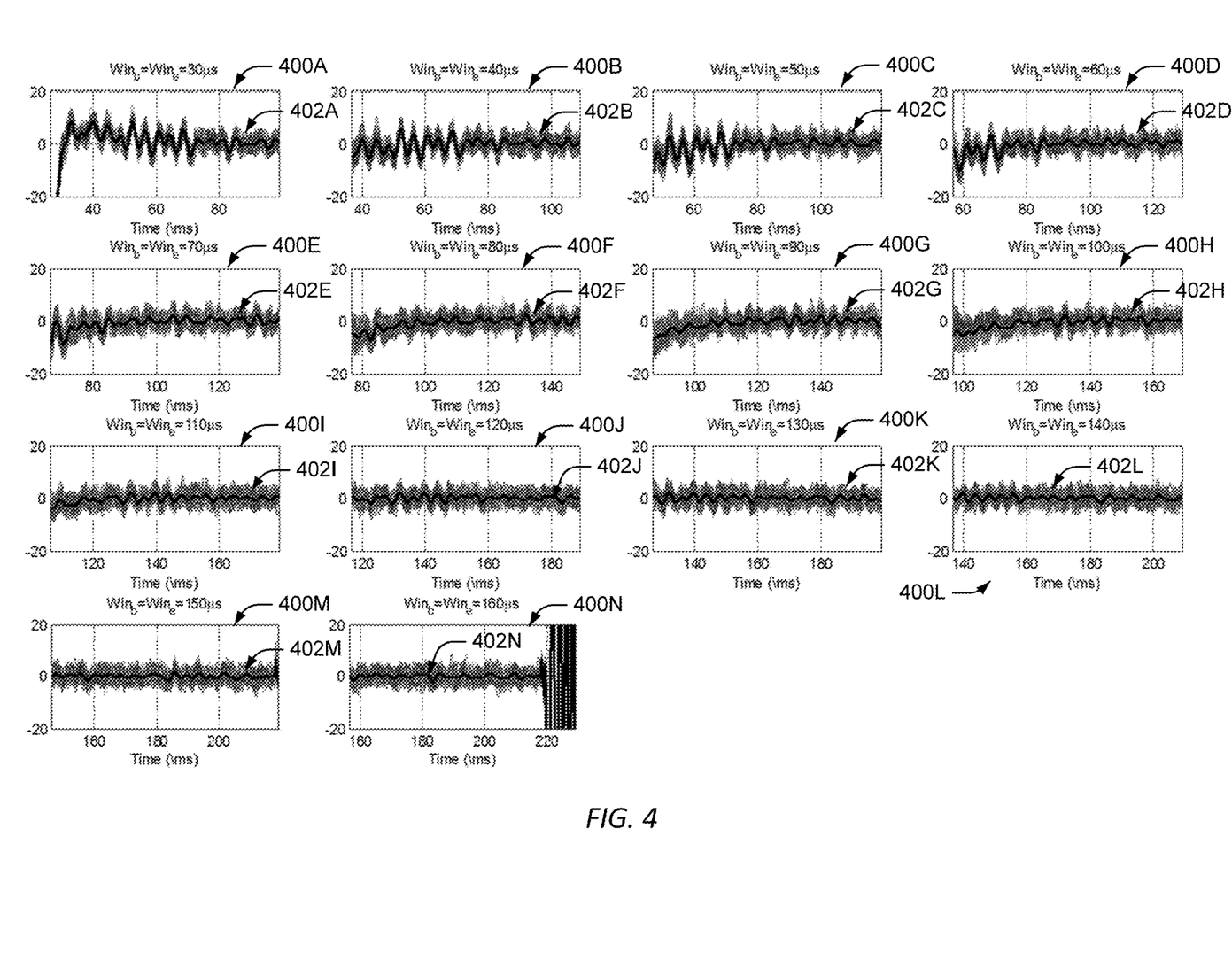
FIG. 4 includes multiple diagrams that illustrate raw calibration waveforms for various acquisition windows in accordance with one or more embodiments.

FIG. 4 includes multiple diagrams 400A-400N that illustrate raw calibration waveforms for various acquisition windows in accordance with one or more embodiments. More specifically, diagrams 400A-400N represent the waveforms of fourteen different acquisition windows acquired for a given azimuth (e.g., the $72^{nd}$ azimuth) of the calibration procedure. The first diagram 400A represents the one-hundred waveforms acquired as a result of rotating the logging tool 126 one-hundred times while taking measurements at the $72^{nd}$ azimuth during the first acquisition window (e.g., an acquisition window having a time delay of about 30 μs and a duration of about 70 μs), the second diagram 400B represents the one-hundred waveforms acquired as a result of rotating the logging tool 126 one-hundred times while taking measurements at the $72^{nd}$ azimuth during the second acquisition window (e.g., an acquisition window having a time delay of about 40 μs and a duration of about 70 µs), and so forth. The values window begin (WINB) and window end (WINE) represent the time offset of the start time and end time of the acquisition window. For example, a WINB value of about 30 µs, a WINE value of about 30 µs, and a duration of about 70 µs results an in an acquisition window that starts at about 30 µs after triggering of the transducer for the measurement and ends about 70 µs later (e.g., at about 120 µs after triggering of the transducer for the measurement). In some embodiments, WINE and WINB are set to the same value. In some embodiments, the parameters WINB/WINE vary from about 30 µs to about 160 µs.

Each of the diagrams 400A-400N can include curves representing the approximately one-hundred raw waveforms recorded for each value of WINB/WINE. For example, diagram 400A includes curves for the one-hundred waveforms recorded for WINB=WINE=30 µs, diagram 400B includes curves for the one-hundred waveforms recorded for WINB=WINE=40 µs, and so forth. The bold/dark black curves 402A-402N in each of the respective diagrams 400A-400N represents the mean-value waveform for the corresponding one-hundred waveforms of the diagram. For example, the mean curve 402A represents the mean-value waveform for the corresponding one-hundred waveforms of the diagram 400A, the mean curve 402B represents the mean-value waveform for the corresponding one-hundred waveforms of the diagram 400B, and so forth.

Figure 5:
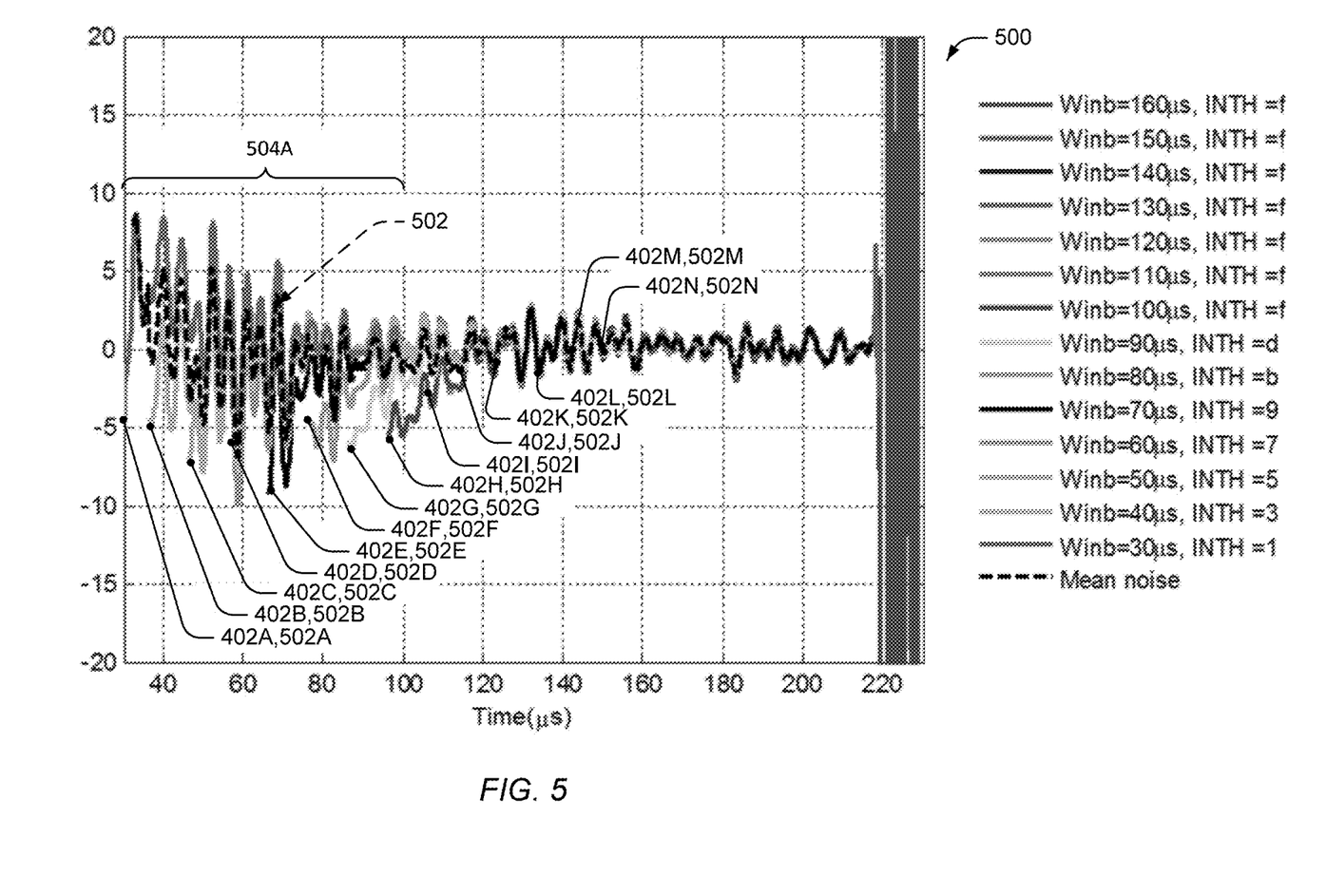
FIG. 5 is a diagram that illustrates a mean-noise waveform in accordance with one or more embodiments.

FIG. 5 is a diagram 500 that illustrates a mean-noise waveform 502 in accordance with one or more embodiments. In the illustrated embodiment, waveforms 402A and 402N are time-aligned based at least in part on their offsets from the trigger of the transducer for the measurements (e.g., their respective WINB/WINE values). For example, mean curve 402A has a starting point 502A at about 30 µs, mean curve 402B has a starting point 502B at about 40 µs, and so forth. Each of the curves may span across a time period corresponding to the respective acquisition window. For example, mean curve 402A may span across window 504A, from about 30 µs to about 100 µs. The mean-noise waveform 502 may represent a mean of the contributing portions of the mean curves 402. For example, a given portion of the mean curve 502 may include a mean of the curve(s)/waveforms acquired during that time period. For example, a point on mean curve 502 at about 35 µs may include only the contribution from the corresponding point on mean curve 402B, a point on mean curve 502 at 115 µs may include the contributions from the corresponding points on mean curves 402C-400I.

In some embodiments, obtaining noise calibration data (block 304) can include the logging tool 126 obtaining noise calibration data 138 while operating under a set of calibration conditions, the logging tool 126 transmitting the noise calibration data 138 to the data processing system 160, and the data processing system 160 receiving the noise calibration data 138.

In some embodiments, generating a noise-signature waveform based at least in part on the noise calibration data (block 306) can include generating a noise-signature waveform for the logging tool 126 for a particular acquisition window. This may be the case, for example, if the logging tool 126 is going to be used in operating conditions with a particular acquisition window (e.g., a given WINB/WINE value). For example, if the logging tool 126 is to be used to log data in which an echo (or other signal of interest) is expected to occur between about 30 µs and about 100 µs after the logging tool transducer is triggered, generating a noise-signature waveform for the logging tool 126 may include generating, or otherwise identifying the mean curve 402A (corresponding to WINB=WINE=30 µs) as the noise-signature waveform 220 for the logging tool 126, and/or, identifying the portion of mean curve 502 occurring between about 30 µs and about 100 µs, as the noise-signature waveform 220 for the logging tool 126. As a further example, if the logging tool 126 is to be used to log data in which an echo (or other signal of interest) is expected to occur between about 100 µs and about 170 µs after the logging tool transducer is triggered, generating a noise-signature waveform for the logging tool 126 may include generating, or otherwise identifying the mean curve 402H (corresponding to WINB=WINE=100 µs) as the noise-signature waveform 220 for the logging tool 126, or, in the alternative, identifying the portion of mean curve 502 occurring between about 100 µs and about 170 µs, as the noise-signature waveform 220 for the logging tool 126.

In some embodiments, generating a noise-signature waveform based at least in part on the noise calibration data (block 306) can include generating a noise-signature waveform for the logging tool 126 across some or all acquisition windows. This may be the case, for example, if the logging tool 126 is to be used with a variety of different acquisitions windows (e.g., different WINB/WINE values) to log data. For example, if the logging tool 126 is to be used to log data in a variety of conditions such that an echo (or other signal of interest) is expected to occur anywhere between about 30 µs and about 220 µs after the logging tool transducer is triggered, generating a noise-signature waveform for the logging tool 126 may include generating the mean curve 506, or otherwise identifying the mean curve 506 as the noise-signature waveform 220 for the logging tool 126.

The noise-signature waveform 220 may correspond to the conditions in which the noise calibration data 138 was acquired. For example, if the noise-signature waveform 220 for the logging tool 126 is based at least in part on a first set of noise calibration data 138 acquired under calibration conditions including an azimuth of about 355°, a depth of about 15,000 feet in wellbore 116, a gain of about 42 dB, an emission voltage of about 2V, a tool-rotation rate of about five rev/sec, a measurement rate of about seventy-two measurements per revolution, an acquisition window of about 30 µs to about 100 µs (e.g., WINB=WINE=30 µs), a pressure of about 20,000 psi, and a temperature of about 200° C., the noise-signature waveform 220 may be associated with these calibration conditions. For example, the noise-signature waveform 220 may be stored in memory 202 in association with these conditions. In some embodiments, multiple noise-signature waveforms 220 can be generated for the logging tool 126. For example, a first noise-signature waveform 220 can be generated using noise calibration data 138 acquired under a first set of calibration conditions, a second noise-signature waveform 220 can be generated using noise calibration data 138 acquired under a second set of calibration conditions and so forth. As discussed herein a particular noise-signature waveform 220 corresponding to a set of conditions may be useful for correcting a log waveform corresponding to the same or a similar set of conditions.

Figure 6A:
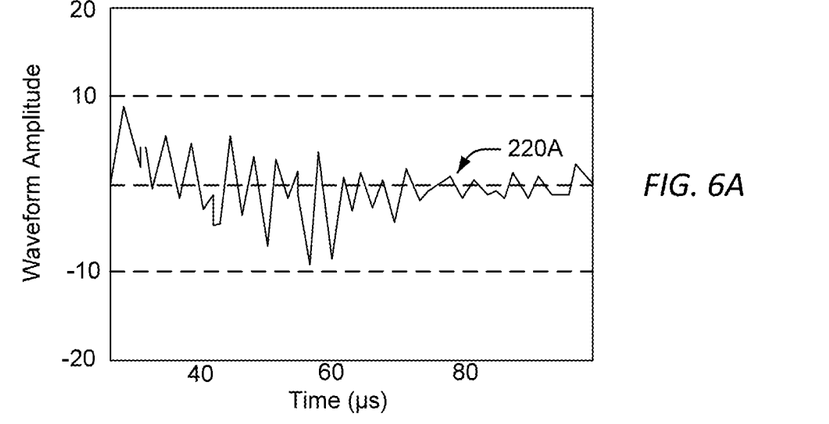
FIG. 6A is a diagram that illustrates a noise-signature waveform in accordance with one or more embodiments.

FIG. 6A is a diagram that illustrates an exemplary noise-signature waveform 220A in accordance with one or more embodiments. Noise-signature waveform 220A may correspond to a $72^{nd}$ set of calibration conditions, including an azimuth of about 355°, a depth of about 15,000 feet in wellbore 116, a gain of about 42 dB, an emission voltage of about 2V, a tool-rotation rate of about five rev/sec, a measurement rate of about seventy-two meas/rev, an acquisition window of about 30 µs to about 100 µs (e.g., WINB=WINE=30 µs), a pressure of about 20,000 psi, and a temperature of about 200° C. Noise-signature waveform 220A may for example correspond to the mean curve 402A of diagram 400A, and/or the portion of mean curve 502 occurring between about 30 µs and about 100 µs.

Although the above process is described and illustrated with regard to determining a noise-signature waveform 220 for a given azimuth, a similar process may be performed for each of the measurement azimuths For example, if seventy-two measurements are performed per revolution of the logging tool 126, a set of noise calibration data 138 can be acquired for each of the seventy-two azimuths and a noise-signature waveform 220 can be generated for each of the seventy-two azimuths. Thus, for example, a single noise-signature waveform 220 can be created for each of the seventy-two azimuths at a depth of about 15,000 feet in wellbore 116, a gain of about 42 dB, an emission voltage of about 2V, a tool-rotation rate of about five rev/sec, a measurement rate of about seventy-two meas/rev, an acquisition window of about 30 µs to about 100 µs (WINB=WINE=30 µs), a pressure of about 20,000 psi, and a temperature of about 200° C.

In some embodiments, generating a noise-signature waveform based at least in part on the noise calibration data (block 306) can include the data processing system 160 generating a noise-signature waveform based at least in part on the noise calibration data 138.

Referring to method 300B of FIG. 3B, in some embodiments, disposing a logging tool in the well for data logging (block 310) includes positioning the logging tool 126 in the wellbore 116 at the logging location. For example, if the logging tool 126 is to be used to log a section of the wellbore 116 from about 15,000 feet to about 15,100 feet, disposing the logging tool 126 in the well 115 for data logging may include lowering the logging tool 126 to a depth of about 15,000 feet in the wellbore 116, and rotating the tool to an azimuth of about 0° (e.g., an azimuth at which a first measurement is to be taken).

In some embodiments, data processing system 160 controls disposing the logging tool 126 in the well 115 for data logging, including positioning of the logging tool 126 in the wellbore 116 at the logging location.

In some embodiments, obtaining log data for a well (block 312) can include operating the logging tool 126 in the well 115 under a given set of logging/operating conditions to obtain log data 136 corresponding to the logging location. For example, obtaining log data 136 for the well 115 may include acquiring log data 136 from logging tool 126 while simultaneously rotating and lowering the logging tool 126 from about 15,000 ft to 15,100 ft within the wellbore 116. In such an embodiment, the logging tool 126 may be operated with a relatively high emission voltage (e.g., about 10V), a gain that is lower than that used for calibration (e.g., about 20 dB), a rotation rate that is the same or similar to the rotation rate used during calibration (e.g., about five rev/sec), a measurement rate that is the same or similar to the measurement rate used during calibration (e.g., about seventy-two meas/rev) and/or an acquisition window that is the same or similar to the acquisition window used during calibration (e.g., from about 30 µs to about 100 µs, WINB=WINE=30 µs). The section of the wellbore 116 that is logged may include conditions that are the same or similar to those in which the logging tool 126 was calibrated, such as a pressure of about 20,000 psi and a temperature of about 200° C.

Measurements may be taken as the logging tool 126 is rotated within the wellbore 116 and simultaneously lowered within the wellbore 116, resulting in measurement being taken in a spiraled pattern. If for example, the logging tool makes one-thousand revolutions over the about 100 foot span and acquires about seventy-two measurements per revolution, obtaining log data for the well may include obtaining approximately 72,000 measurements. Each measurement may include triggering of a transducer of the logging tool 126, followed by a corresponding measurement of the return-signal, and generation of a set of logging data 136 representing the corresponding measurement. For example, a measurement may include activating an acoustic transducer of logging tool 126 pointed at a given azimuth and depth to generate an acoustic pulse that is directed into the medium (e.g., the casing, the cement, fluids, the formation and/or the like) located at the given azimuth and depth, sensing the resulting acoustic signals reflected from the adjacent materials (also referred to as the "logging target"), and generating a set of log data 136 that represents the sensed acoustic signals. In some embodiments, the measurement occurs during a specified acquisition window. For example, if the logging tool 126 is to be used to log data in which an echo (or other signal of interest) is expected to occur between about 30 µs and about 100 µs after the logging tool transducer is triggered, the logging tool 126 may be configured to sense/measure signals between about 30 µs and about 100 µs after the transducer is triggered. Thus, the resulting log data 136 may represent the acoustic signals sensed during the corresponding acquisition window (e.g., the acoustic signals sensed between about 30 µs and 100 µs after the transducer is triggered).

In some embodiments, obtaining noise calibration data (block 312) can include the logging tool 126 obtaining log data 136 while operating under a set of operating conditions, the logging tool 126 transmitting the log data 136 to the data processing system 160, and the data processing system 160 receiving the log data 136.

Figure 6B:
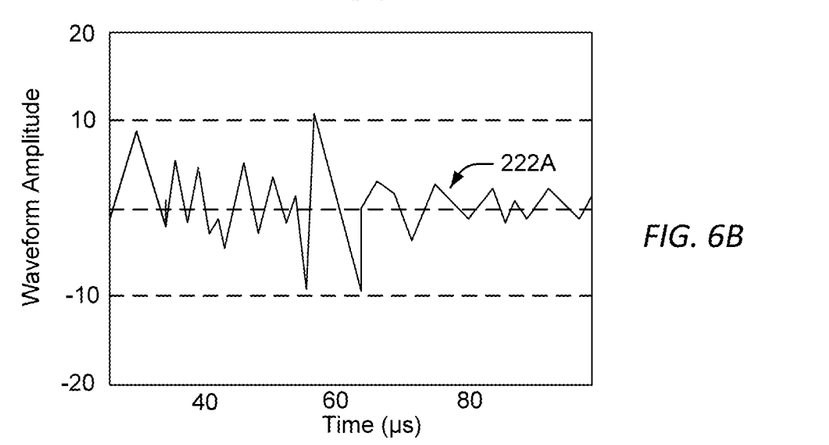
FIG. 6B is a diagram that illustrates an uncorrected logging waveform in accordance with one or more embodiments.

In some embodiments, generating uncorrected logging waveforms (block 314), can include generating a logging waveform for each of the measurements during a logging cycle. For example, for the above described logging from about 15,000 feet to about 15,100 feet within the wellbore 116, generating an uncorrected logging waveform 222 may include generating an uncorrected log waveform 222 for each of the 72,000 measurements acquired. For example, a first uncorrected logging waveform 222 may be generated using the set of logging data 136 acquired via the first measurement taken at a depth of about 15,100 feet and an azimuth of about 0°, and during acquisition window from about 30 µs and about 100 µs (e.g., WINB=WINE=30 µs). A seventy-second uncorrected logging waveform 222 may be generated using the set of logging data 136 acquired via the seventy-second measurement taken at a depth about 15,100.1 feet and an azimuth of about 355°, and during acquisition window from about 30 µs and about 100 µs (e.g., WINB=WINE=30 µs). FIG. 6B is a diagram that illustrates an exemplary uncorrected logging-waveform 222A in accordance with one or more embodiments. The uncorrected logging-waveform 222A may represent the seventy-second uncorrected logging waveform 222. An uncorrected logging-waveform 222 may include a representation of the measured return signal. An uncorrected logging-waveform 222 may include acoustic contributions from in-situ noise (e.g., noise generated by the tool under the given logging conditions) and the acoustic signals reflected from the logging target.

In some embodiments, generating uncorrected logging waveforms (block 314) can be performed by the data processing system 160.

Figure 6C:
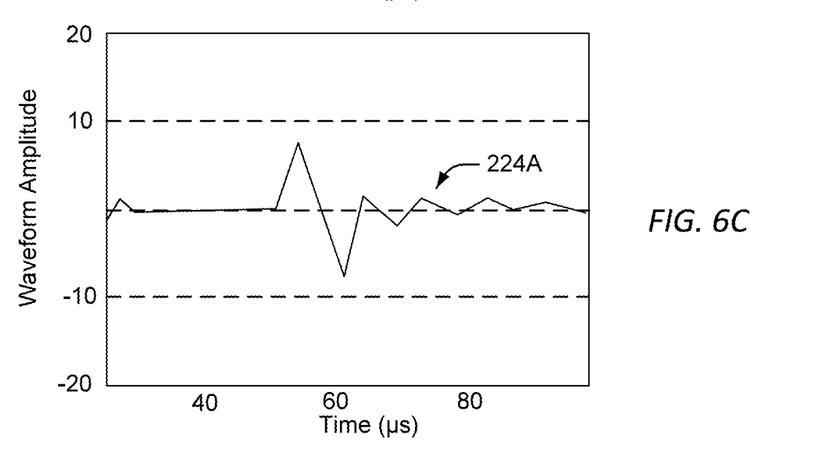
FIG. 6C is a diagram that illustrates a corrected logging waveform in accordance with one or more embodiments.

In some embodiments, modifying the uncorrected logging waveforms based at least in part on noise-signature waveform to generate corrected logging waveforms (block 316) can include, for each of the uncorrected logging waveforms 222, subtracting a corresponding noise-signature waveform 220 (or otherwise removing noise contributions) therefrom to generate a corresponding corrected logging waveform 224. For example, for the above described logging from about 15,000 feet to about 15,100 feet within the wellbore 116, modifying the uncorrected logging waveforms 222 to generate corrected logging waveforms 224 may include, for each of the 72,000 uncorrected waveforms 222, subtracting a corresponding noise-signature waveform 220 (or otherwise removing noise contributions) therefrom to generate a corresponding set of 72,000 corrected logging waveforms 224. With regard to the seventy-second uncorrected logging waveform 222A, for example, generating a corrected logging waveform 224 may include subtracting noise-signature waveform 220A of FIG. 6A from uncorrected logging waveform 222A of FIG. 6B to generate a corresponding corrected logging waveform 224A illustrated in FIG. 6C. Thus, the corrected logging waveform 224A may correspond to a corrected logging waveform 224 for the seventy-second measurement taken at a set of logging/operating conditions including a depth about 15,100.1 feet and an azimuth of about 355°, a gain of about 42 dB, an emission voltage of about 2V, a tool-rotation rate of about five rev/sec, a measurement rate of about seventy-two meas/rev, an acquisition window from about 30 μs and about 100 μs (e.g., WINB=WINE=30 μs), a pressure of about 20,000 psi, and a temperature of about 200° C.

In some embodiments, characteristics of the waveforms to be subtracted from one another can be modified to be the same or similar. For example, the amplitude of the noise-signature waveform 220 may be adjusted to match the amplitude of uncorrected logging waveform 222 from which it is to be subtracted, the time scale of the noise-signature waveform 220 (e.g., including an origin) may be aligned with the time scale of uncorrected logging waveform 222 from which it is to be subtracted, and/or the noise-signature waveform 220 may be subjected to the same or similar processing (e.g. subjected to filtering and/or decimation) that the uncorrected logging waveform 222 from which it is to be subtracted has been subjected to.

In some embodiments, modifying the uncorrected logging waveforms (block 316) can include subtracting, from an uncorrected logging waveform 222, a version of the noise-signature waveform 220 that has been subjected to the same or similar levels of processing as the uncorrected logging waveform 222. In some embodiments, modifying the uncorrected logging waveforms may be done in the early stages of processing, using raw versions of the waveforms. For example, modifying the uncorrected logging waveforms may include subtracting a raw version of the noise-signature waveform 220 from a corresponding uncorrected logging waveform 222. A raw version of a noise-signature waveform 220 may include a noise-signature waveform 220 that is generated using raw noise calibration data 138, and has not been subjected processing (e.g., has not been subjected to filtering). A raw version of an uncorrected logging waveform 222 may include an uncorrected logging waveform 222 that is generated using raw log data 136, and has not been subjected processing (e.g., has not been subjected to filtering). A raw version of noise calibration data 138 may include noise calibration data 138 that has not been subjected processing (e.g., has not been subjected to filtering). A raw version of noise log data 136 may include log data 136 that has not been subjected processing (e.g., has not been subjected to filtering).

In some embodiments, modifying the uncorrected logging waveforms can be done in later stages of processing, using versions of the waveforms that have both been subjected to the same or similar processing. For example, modifying the uncorrected logging waveforms may include subtracting a processed version of the noise-signature waveform 220 (e.g., generated as a result of low frequency filtering of the raw version of the noise-signature waveform 220 and/or noise calibration data 138) from a corresponding processed version of the uncorrected logging waveform 222 (e.g., generated as a result of low frequency filtering of the raw version of the uncorrected logging waveform 222 and/or log data 136). The resulting corrected logging waveform 224 may be subjected to additional processing, such as frequency and group delay processing (e.g., $T^3$ processing) (e.g., $T^3$ processing, Traitement Très Tôt, or Very Early Processing).

In some embodiments, modifying the uncorrected logging waveforms based at least in part on noise-signature waveform to generate corrected logging waveforms (block 316) can be performed by the data processing system 160.

In some embodiments, generating corrected log data (block 318) includes generating corrected log data 226 based at least in part on the corrected logging waveforms 224. For example, for the above described logging from about 15,000 feet to about 15,100 feet within the wellbore 116, generating corrected log data may include generating corrected log data 226 based at least on the corresponding 72,000 corrected waveforms 224. Corrected log data 226 may include the corrected well log 226A, generated using the corrected log data 226. The well log 226A may be indicative of acoustic impedances at respective depths and azimuths. For example, corrected well log 226A plotting the de-noised acoustic impedances at each of the 72,000 combinations of depth and azimuth at which the corresponding measurements were acquired for well 115.

In some embodiments, generating corrected log data (block 318) can be performed by the data processing system 160.

In some embodiments, determining characteristic(s) of the well ("well characteristics") based at least in part on the corrected log data (block 320) can include determining one or more well characteristics 228 for the well 115 based at least in part on the corrected log data 226. For example, corrected well log 226A may be used to determine various characteristics of the corresponding portion of the wellbore 116, such as characteristics of the formation, the cementing, and so forth in the 100 foot section from 15,000 feet to 15,100 feet within the wellbore 116.

In some embodiments, determining well characteristics based at least in part on the corrected log data (block 320) is performed by the data processing system 160.

In some embodiments, presenting the results (block 322) includes presenting the corrected log data 226 and/or the determined well characteristic(s) 228. For example, for the above described logging from 15,000 feet to 15,100 feet within the wellbore 116, presenting the corrected log data 226 may include displaying corrected log data 226 (e.g., the corrected well log 226A) and/or the determined well characteristic(s) 228 via display 212A for viewing by a user, such as a well operator. Such results can be used by the operator to make various decisions regarding the well 115. For example, the operator can use the corrected well log 226A to determine whether the cementing is properly set. In some cases, a well operator may determine that the cement has properly set if, for example, the well log indicates that the cement of the annular fill 118 has a solid character. In some cases, a well operator may determine that the cement has not properly set if, for example, the well log indicates that the cement of the annular fill 118 has a liquid or gas character.

In some embodiments, presenting the results (block 322) can be performed by the data processing system 160.

It will be appreciated that the methods 300A and 300B are exemplary embodiments of methods that may be employed in accordance with techniques described herein. The methods 300A and 300B may be modified to facilitate variations of its implementations and uses. The order of the methods 300A and 300B and the operations provided therein may be changed, and various elements may be added, reordered, combined, omitted, modified, etc. Portions of the methods 300A and 300B may be implemented in software, hardware, or a combination thereof. Some or all of the portions methods 300A and 300B may be implemented by one or more of the modules/applications described herein.

In some embodiments, calibration and logging processes can be performed in separate trips downhole. For example, a calibration process may be performed to generate noise-signature waveforms 220 for the logging tool 126 under a set of calibration conditions (e.g., including a depth of about 15,000 feet in wellbore 116), the logging tool 126 may be extracted from the wellbore 116, and the logging tool 126 may be reinserted into the wellbore 116 and used for a corresponding logging operation (e.g., to log the well 115 from about 15,000 feet to about 15,100 feet under a set of operating conditions that correspond to the calibration conditions).

In some embodiments, a calibration process may be performed in combination with a corresponding logging operation during the same trip downhole. For example, a calibration process may be performed to generate a noise-signature waveform 220 for the logging tool 126 under a set of calibration conditions (e.g., including a depth of about 15,000 feet in wellbore 116) and, (without removing the tool from the wellbore 116) the logging tool 126 may be used for a corresponding logging operation (e.g., to log the well 115 from about 15,000 feet to about 15,100 feet under a set of operating conditions that correspond to the calibration conditions). In some embodiments, such a logging operation may be performed immediately after the calibration process. For example, the logging operation from about 15,000 feet to about 15,100 feet may be performed within minutes of the calibration process at about 15,000 feet. In some embodiments, the calibration process may be incorporated into the logging process. For example, a calibration process may be automatically initiated (or otherwise performed) before or after a corresponding logging operation. In the case of a logging operation that includes logging the well 115 from about 15,000 feet to about 15,100 feet, for example, data processing system 160 may invoke calibration module 210a when the logging tool 126 is located at about 15,000 feet, followed by invoking of logging module 210b to cause the logging of the well 115 from about 15,000 feet to about 15,100 feet, including generating corrected log data 318 based on the calibration process at about 15,000 feet.

In some embodiments, a calibration process can be automatically initiated (or otherwise performed) periodically during a logging operation (e.g., every 100 feet). In the case of a logging operation that includes logging the well 115 from about 15,000 feet to about 16,000 feet, for example, data processing system 160 may invoke calibration module 210a when the logging tool 126 is located at about 15,000 feet, followed by invoking of logging module 210b to cause the logging of the well 115 from about 15,000 feet to about 15,100 feet, including generating corrected log data 318 based on the calibration process at about 15,000 feet. The data processing system 160 may invoke calibration module 210a when the logging tool 126 is located at about 15,100 feet, followed by invoking of logging module 210b to cause the logging of the well 115 from about 15,100 feet to about 15,200 feet, including generating corrected log data 226 based on the calibration process at about 15,100 feet, and so forth. Characteristics of each section of the well 115 may be determined based at least in part on the corresponding calibration operation.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" may include a combination of two or more elements. As used throughout this application, the phrase "based at least in part on" does not limit the associated operation to being solely based at least in part on a particular item. Thus, for example, processing "based at least in part on" data A may include processing based at least in part on data A and based at least in part on data B unless the content clearly indicates otherwise. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A method comprising:
acquiring, by one or more processors, noise-calibration data for a logging tool, wherein the noise-calibration data comprises data obtained by the logging tool operating under one or more calibration conditions;
generating, by the one or more processors, a noise-signature waveform for the logging tool based at least in part on the noise-calibration data;
acquiring, by the one or more processors, logging data from the logging tool, wherein the logging data comprises data obtained by the logging tool operating in a wellbore under one or more operating conditions;
generating, by the one or more processors and based at least in part on the logging data, an uncorrected logging waveform for the logging tool operating in the wellbore under the one or more operating conditions;
modifying, by the one or more processors, the uncorrected logging waveform based at least in part on the noise-signature waveform to generate a corrected logging waveform for the wellbore;
wherein acquiring the logging data and noise-calibration data includes emitting pulses of acoustic energy by a transducer and measuring acoustic waveforms that are returned;
wherein the one or more calibration conditions comprise a gain that is greater than an operating gain for the logging tool and an emission voltage that is less than an operating emission voltage for the logging tool.

2. The method of claim 1, wherein the one or more calibration conditions further comprise at least one of the following: a depth that is the same as an operating depth for the logging tool, an azimuth that is the same as an operating azimuth for the logging tool, an acquisition window that is the same as an operating acquisition window for the logging tool, a tool rotation rate that is the same as an operating tool-rotation rate for the logging tool, a pressure that is the same as an operating pressure for the logging tool, or a temperature that is the same as an operating temperature for the logging tool.

3. The method of claim 1, wherein the noise-calibration data comprises a sampling rate that is the same as a sampling rate of the logging data.

4. The method of claim 1, wherein the noise-calibration data is time-referenced to an event of the logging tool.

5. The method of claim 1, wherein modifying the uncorrected logging waveform based at least in part on the noise-signature waveform comprises subtracting the noise-signature waveform from the uncorrected logging waveform.

6. The method of claim 5, wherein subtracting the noise-signature waveform from the uncorrected logging waveform comprises aligning the noise-signature waveform and the uncorrected logging waveform to an event in the time domain, wherein segments of the noise-signature waveform are subtracted from segments of the uncorrected logging waveform corresponding to the same temporal offset from the event in the time domain.

7. The method of claim 5, wherein subtracting the noise-signature waveform from the uncorrected logging waveform comprises adjusting an amplitude of the noise waveform to correspond to an operating gain for the logging tool.

8. The method of claim 1, wherein the noise-calibration data comprises a plurality of waveforms, and wherein the noise-signature waveform comprises a mean of the plurality of waveforms.

9. The method of claim 1, wherein the generating a noise-signature waveform for the logging tool based at least in part on the noise-calibration data comprises generating a noise-signature waveform based at least in part on portion of a noise-signature waveform that corresponds to the acquisition window of the operating conditions.

10. The method of claim 1,
wherein generating an uncorrected logging waveform comprises generating an uncorrected logging waveform using a raw version of the logging data, and
wherein generating a noise-signature waveform for the logging tool comprises generating a noise-signature waveform for the logging tool using a raw version of the noise-calibration data.

11. The method of claim 1,
wherein generating an uncorrected logging waveform comprises:
processing raw logging data, using a processing technique, to generate a processed version of the logging data; and
generating an uncorrected logging waveform using the processed version of the logging data, and
wherein generating a noise-signature waveform for the logging tool comprises:
processing raw noise-calibration data, using the processing technique, to generate a processed version of the noise-calibration data; and
generating a noise-signature waveform for the logging tool using the processed version of the noise-calibration data.

12. The method of claim 11, wherein the processing technique comprises low frequency filtering.

13. The method of claim 1, further comprising determining, by the one or more processors, a characteristic of the well based at least in part on the corrected logging waveform.

14. The method of claim 1,
wherein the noise-calibration data comprises data obtained by the logging tool operating in a first section of the wellbore under one or more calibration conditions;
wherein the logging data comprises data obtained by the logging tool operating in the first section of the wellbore under one or more operating conditions, and
wherein the corrected logging waveform comprises a first corrected logging waveform for the first section of the wellbore, and
further comprising:
acquiring, by one or more processors, second noise-calibration data for the logging tool, wherein the second noise-calibration data comprises data obtained by the logging tool operating in a second section of the wellbore under one or more second calibration conditions;
generating, by the one or more processors, a second noise-signature waveform for the logging tool based at least in part on the second noise-calibration data;
acquiring, by the one or more processors, second logging data from the logging tool, wherein the second logging data comprises data obtained by the logging tool operating in the second section of the wellbore under one or more second operating conditions;
generating, by the one or more processors, a second uncorrected logging waveform based at least in part on the second logging data; and modifying the second uncorrected logging waveform based at least in part on the second noise-signature waveform to generate a corrected logging waveform for the second section of the wellbore.

15. The method of claim 14, further comprising:
determining, by the one or more processors, a characteristic of the first section of the wellbore based at least in part on the first corrected logging waveform; and
determining, by the one or more processors, a characteristic of the second section of the wellbore based at least in part on the second corrected logging waveform.

16. The method of claim 14, wherein the noise calibration data, the second noise calibration data, the logging data, and the second logging data is obtained during a single trip of the logging tool down-hole.

17. The method of claim 1, further comprising automatically initiating a calibration procedure prior to initiation of a logging operation,
the calibration procedure comprising:
the acquiring noise-calibration data for a logging tool, wherein the noise-calibration data comprises data obtained by the logging tool operating under one or more calibration conditions; and
generating, by the one or more processors, a noise-signature waveform for the logging tool based at least in part on the noise-calibration data; and
the logging procedure comprising:
acquiring, by the one or more processors, logging data from the logging tool, wherein the logging data comprises data obtained by the logging tool operating in a wellbore under one or more operating conditions;
generating, by the one or more processors and based at least in part on the logging data, an uncorrected logging waveform for the logging tool operating in the wellbore under the one or more operating conditions; and
modifying, by the one or more processors, the uncorrected logging waveform based at least in part on the noise-signature waveform to generate a corrected logging waveform for the wellbore.

18. A non-transitory computer-readable storage medium comprising computer-executable instructions that are executable by one or more processors to cause the one or more processors to:
acquire noise-calibration data for a logging tool, wherein the noise-calibration data comprises data obtained by the logging tool operating under one or more calibration conditions;
generate a noise-signature waveform for the logging tool based at least in part on the noise-calibration data;
acquire logging data from the logging tool, wherein the logging data comprises data obtained by the logging tool operating in a wellbore under one or more operating conditions;
generate an uncorrected logging waveform based at least in part on the logging data; and modify the uncorrected logging waveform based at least in part on the noise signature waveform to generate a corrected logging waveform for the wellbore;
wherein acquiring the logging data and noise-calibration data includes emitting pulses of acoustic energy by a transducer and measuring acoustic waveforms that are returned;
wherein the one or more calibration conditions comprise a gain that is greater than an operating gain for the logging tool and an emission voltage that is less than an operating emission voltage for the logging tool.

19. A system comprising:
a logging tool configured to obtain data wherein obtaining the data includes emitting pulses of acoustic energy by a transducer and measuring acoustic waveforms that are returned;
a logging processor comprising:
one or more processors;
one or more memory storing computer-executable instructions, that are executable by the one or more processors to cause the one or more processors to:
acquire, from the logging tool, noise-calibration data obtained by the logging tool operating under one or more calibration conditions;
generate a noise-signature waveform for the logging tool based at least in part on the noise-calibration data;
acquire, from the logging tool, logging data obtained by the logging tool operating in a wellbore under one or more operating conditions, generate an uncorrected logging waveform based at least in part on the logging data;
modify the uncorrected logging waveform based at least in part on the noise-signature waveform to generate a corrected logging waveform for the wellbore, wherein the one or more calibration conditions comprise a gain that is greater than an operating gain for the logging tool and an emission voltage that is less than an operating emission voltage for the logging tool.

* * * * *